United States Patent
Mace et al.

(10) Patent No.: US 8,113,783 B2
(45) Date of Patent: Feb. 14, 2012

(54) ASSEMBLY OF A FAN BLADE AND OF ITS DAMPER, FAN BLADE DAMPER AND METHOD FOR CALIBRATING THE DAMPER

(75) Inventors: Jérôme Paul Marceau Mace, Cesson (FR); Thierry Nitre, Tigery (FR); Patrick Jean-Louis Reghezza, Vaux le Penil (FR)

(73) Assignee: SNECMA, Paris (FR)

( * ) Notice: Subject to any disclaimer, the term of this patent is extended or adjusted under 35 U.S.C. 154(b) by 663 days.

(21) Appl. No.: 12/269,378

(22) Filed: Nov. 12, 2008

(65) Prior Publication Data

US 2009/0123286 A1    May 14, 2009

(30) Foreign Application Priority Data

Nov. 12, 2007 (FR) ....................... 0707923

(51) Int. Cl.
*F01D 5/26* (2006.01)
(52) U.S. Cl. ...................................... 416/190
(58) Field of Classification Search .................. 416/190
See application file for complete search history.

(56) References Cited

U.S. PATENT DOCUMENTS

| 3,181,835 A | 5/1965 | Davis |
| 3,887,298 A | 6/1975 | Hess et al. |
| 6,494,679 B1 * | 12/2002 | Gadre et al. ............... 416/145 |
| 2006/0257262 A1 | 11/2006 | Itzel et al. |

FOREIGN PATENT DOCUMENTS

| EP | 1 452 692 A2 | 9/2004 |
| EP | 1 477 634 A2 | 11/2004 |

* cited by examiner

*Primary Examiner* — Stephen Jones

(74) *Attorney, Agent, or Firm* — Oblon, Spivak, McClelland, Maier & Neustadt, L.L.P.

(57) ABSTRACT

A fan blade assembly of a turbojet with fan and a fan blade damper is disclosed. The fan blade includes a root and a platform. The fan blade damper is suitable for being attached in a housing formed in the lower face of the platform. The housing includes an upstream side perpendicular to the root of the blade. The damper includes a front edge of which a first portion is parallel to the upstream side of the housing and of which a second portion is inclined relative to said upstream side. A fan blade damper and a method for calibrating the damper are also disclosed.

14 Claims, 3 Drawing Sheets

ASSEMBLY OF A FAN BLADE AND OF ITS DAMPER, FAN BLADE DAMPER AND METHOD FOR CALIBRATING THE DAMPER

The present invention relates to the field of turbojets and notably turbojets with a front fan.

BACKGROUND OF THE INVENTION

A twin-spool turbojet comprises functionally, from upstream to downstream in the direction of flow of the gases, a fan in a casing, a compressor, a combustion chamber, a turbine and an exhaust nozzle. The two spools, low-pressure and high-pressure, rotate independently of one another and are coaxial. The turbojet comprises a low-pressure BP compressor, upstream of a high-pressure HP compressor, and an HP turbine, upstream of a BP turbine. "Internal" or "external", or "inside" or "outside" will mean in the description radially internal or external to the engine, or radially inside or outside the engine, relative to its axis.

The fan comprises a fan disk, provided with blades, securely attached to the low-pressure shaft via a low-pressure rotor trunnion. Each fan blade extends radially in the engine and comprises, from outside to inside, an airfoil, a platform and a root arranged so as to engage in a groove of the fan disk.

When the blades rotate in the fan casing, the blades tend to vibrate which accelerates their wear and reduces their service life. In order to limit this wear, it is a known practice to place dampers under the platform of the blades in order to absorb the vibrations.

A damper is a rigid part which is placed under the platform, straddling two adjacent blades, so that, while the engine rotates, the damper presses against the platform.

Any relative movement between two adjacent blades causes a friction between the surfaces in contact with the blades and with the damper. This friction contributes to dissipating the energy of vibration.

DESCRIPTION OF THE PRIOR ART

Patent application EP 1 291 492 teaches of a damper retained in a housing formed under the platform of the blade. Contact elements are arranged on the surface of the damper to ensure a correct positioning of the damper. An approximate installation of the damper prevents a flat-to-flat pressure between the surfaces in contact.

The quality of installation of the damper in its housing depends on the manufacturing tolerances of said damper. An added thickness of the damper causes an imperfect positioning and premature wear of the blade with its damper.

It is also possible that the damper is correctly positioned during the installation step but that it moves when the engine operates.

By their shape, the dampers, under the effect of the rotation of the blades, are drawn upstream in order to enter into abutment against the upstream side of the housing arranged in the platform of the blade, a pivot contact being created between the damper and the platform on the upstream side of the housing. The rotation of the damper about this pivot prevents a flat-to-flat pressure, causing the dampers and the blade to wear.

SUMMARY OF THE INVENTION

A first object of the invention is to limit the wear of the parts in order to increase their service life.

Furthermore, depending on the type of turbojet, the fan blade dampers must have a different weight. Standard weight dampers are machined in an empirical manner in order to obtain dampers with the desired weight. This operation of machining, or of calibration, is not carried out in a uniform manner and cannot be reproduced simply and at low cost.

A second object of the invention is to calibrate the weight of the damper in a simple and reproducible manner and without changing the positioning of the damper relative to the platform of the blade.

In order to achieve these objectives and solve the cited disadvantages, the applicant proposes a fan blade assembly of a turbojet with fan and a fan blade damper, the fan blade comprising a root and a platform, the fan blade damper being suitable for being attached in a housing formed in the lower face of the platform, said housing comprising an upstream side perpendicular to the root of the blade, an assembly wherein the damper comprises a front edge of which a first portion is parallel to the upstream side of the housing and of which a second portion is inclined relative to said upstream side.

Preferably, the portion parallel to the upstream side is in abutment against the upstream side of the housing.

Again preferably, the angle formed between the parallel portion of the front edge and the inclined portion is between 10° and 20°.

According to a feature of the invention, the inclined portion forms a flat surface.

According to another feature of the invention, the inclined portion forms a curved surface.

Still preferably, the ridges of the inclined portion are rounded.

Still preferably, the damper comprises on its outer surface at least one metallic contact zone.

The invention also relates to a fan blade damper of a turbojet, extending in its length along an axis oriented X, in its width along an axis oriented Y and in its height along an axis Z, comprising in its length a first front portion and a second rear portion of polygonal cross section relative to the axis X; the damper comprising an upper face comprising an upper right inclined face and an upper left inclined face, a damper wherein a front edge is formed at the front of the first front portion of the damper, the front edge comprising a first face that is transverse relative to the axis X and a second face that is inclined relative to said first face.

The invention also relates to a method for calibrating a damper of a fan blade assembly of a turbojet with fan and a fan blade damper comprising a weight reserve volume, a method wherein:

the reference weight Mref of the damper is determined;
the effective weight Meff of the damper is measured;
the weight reserve volume is cut out so that the weight of the cut-out damper is equal to the reference weight Mref.

As appropriate, the weight reserve volume is situated at the front end of the damper.

DESCRIPTION OF THE DRAWINGS

The invention will be better understood with the aid of the appended drawing in which.

A turbojet comprises functionally, from upstream to downstream in the direction of flow of the gases, a fan in a casing, a compressor, a combustion chamber, a turbine and an exhaust nozzle upstream, the fan comprising a fan disk to which blades are attached. The blades are placed circumferentially on the periphery of the disk, adjacent to one another.

"Internal" or "external", or "inside" or "outside" will mean in the description radially internal or external to the engine, or radially inside or outside the engine, relative to its axis. "Left" or "right" will mean in the description the left or right of the engine, the directions being considered relative to the axis of the engine, oriented from upstream to downstream.

Figure 1:
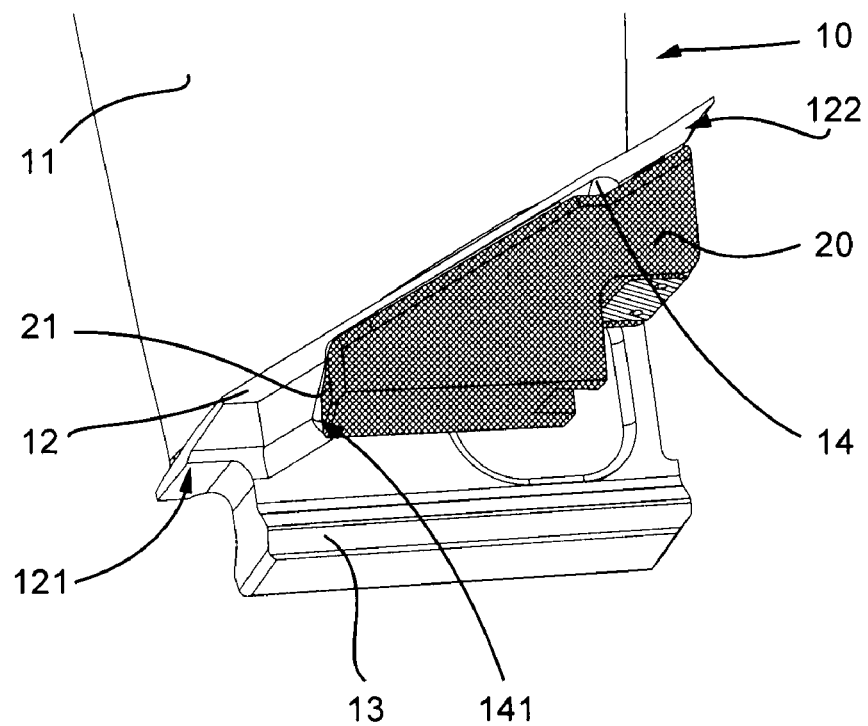
FIG. 1 represents a view in perspective, in the transverse direction relative to the axis of the engine, of an assembly of a fan blade with a damper according to the invention.

With reference to FIG. 1, a damper 20 is housed under the platform 12 of a fan blade 10.

Figure 2:
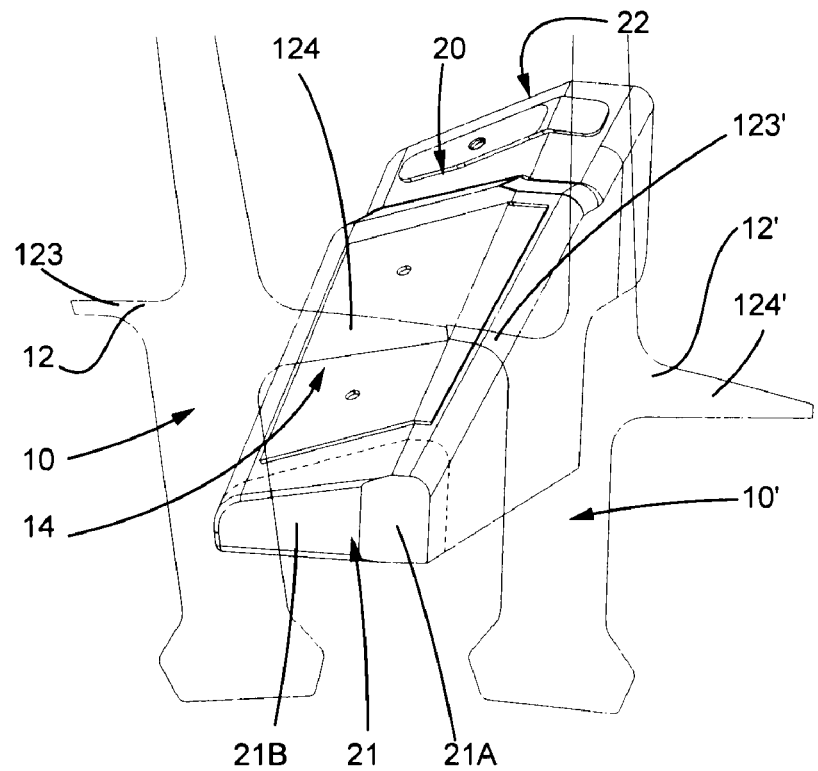
FIG. 2 represents a view from upstream, in the axial direction, of the damper of FIG. 1 positioned under two adjacent fan blades represented in silhouette.

The blade 10 extends radially in the engine and comprises, from outside to inside, an airfoil 11, a platform 12, and a root 13 arranged so as to be attached in the fan disk. With reference to FIG. 2, the platform 12 extends transversely on both sides of the airfoil 11 and consists of a right side platform 124 and a left side platform 123. With reference to FIG. 2, the right side platform 124 is wider than the left side platform 123.

Still with reference to FIG. 2, which shows the relative positioning of a damper 20 between two adjacent blades 10, 10', the damper 20 is placed under the platforms 12, 12' of two blades 10, 10' attached circumferentially to the fan disk, the right platform 124 of the platform 12 of the first blade 10 being in contact with the left platform 123' of the adjacent platform 12' of the second blade 10'.

The damper 20 is housed in a housing 14 formed under the platforms 12, 12'. The housing 14 comprises two portions formed respectively under the first right platform 124 and under the second left platform 123'. The housing 14 is arranged so that the damper 20 is in flat-to-flat contact with the lower surfaces of the platforms 12, 12' when the latter is conveniently housed in said housing 14.

Figure 3:
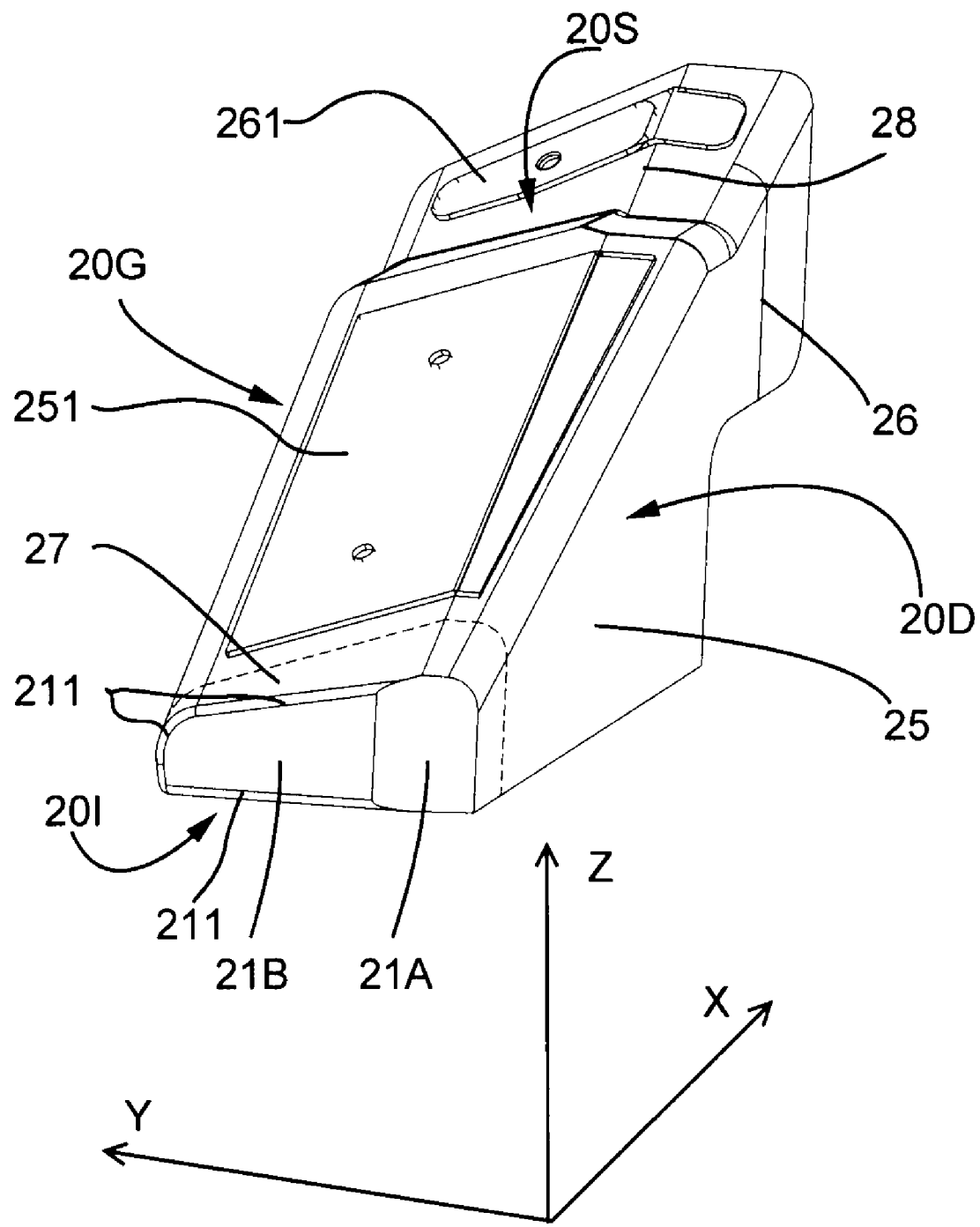
FIG. 3 represents a view in perspective of the damper of FIG. 2 in a coordinate system oriented (X, Y, Z)

With reference to FIG. 3, the damper 20 extends in its length along an axis oriented X, in its width along an axis oriented Y and in its height along an axis oriented Z. The damper comprises in its length a first front portion 25 and a second rear portion 26 offset upward relative to the first front portion 25.

The front and the rear are defined relative to the axis oriented X, the axis X being oriented from front to rear. The bottom (lower portion) and the top (upper portion) of the damper are defined relative to the axis oriented Z, the axis Z being oriented from bottom to top. The left and right directions are defined relative to the axis oriented Y, the axis Y being oriented from right to left.

Therefore, when the damper 20 is positioned in its housing 14, the axis X is substantially parallel to the axis of the engine, the front and rear directions corresponding respectively to the upstream and downstream directions.

The front and rear portions 25, 26 each have a polygonal cross section relative to the axis X, the cross section of the first portion 25 increasing in the direction of the axis X.

The nonparallel lateral faces 20D, 20G of the damper are inclined relative to the plane (X, Z), the distance between the lateral faces 20D, 20G being less in the front portion 25 relative to the rear portion 26. The lateral faces 20D, 20G are orthogonal to the plane (X, Y) comprising the lower face 20I.

The upper face 20S is inclined relative to the plane (X, Y), the distance between the upper face 20S and lower face 20I being less in the front portion 25 relative to the rear portion 26.

The upper face 20S of the damper 20 comprises a right upper face and a left upper face that are inclined and separated by an interface ridge 28. As can be seen in FIG. 2, the left and right upper faces of the damper 20 are respectively in contact with the lower face of the right platform 124 and with the lower face of the left platform 123', the interface ridge 28 being placed in line with the zone of contact between the side platforms 124, 123' of the adjacent platforms 12, 12'.

A front edge 21 is formed at the front of the first front portion of the damper 25, the front edge 21 comprising a first transverse face 21A relative to the axis X and a second inclined face 21B relative to said first face 21A. A rear edge 22 is also formed at the rear of the rear portion 26.

Once the damper 20 has been positioned in its housing 14, the latter extends parallel to the platforms 12, 12'. The housing 14 of the blade comprises an upstream side 141 perpendicular to the root 13, the front edge 21 of the damper 20 being in abutment against said side 141.

Figure 4:
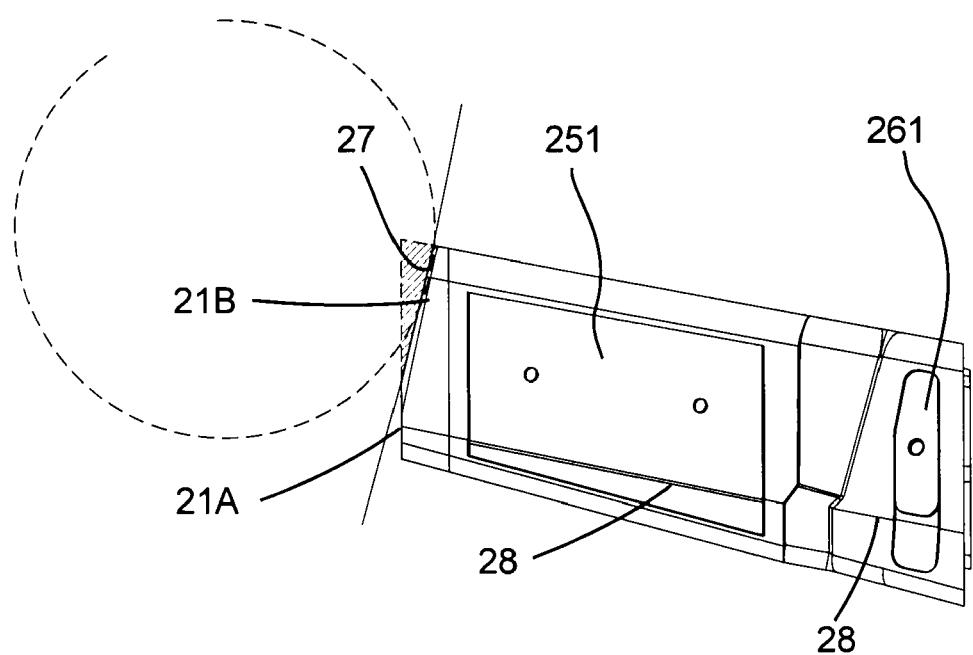
FIG. 4 represents the upper face of the damper of FIG. 3 during the cutting-out step.

With reference to FIG. 3, the two portions 25, 26 are substantially parallel to the platforms 12, 12'. The front portion 25 and rear portion 26 comprise respectively, on their outer faces, two contact elements 251, 261 made of metal and arranged in order to be in contact with the inner surface of the platforms 12, 12' of the blades 10, 10'. These metal contact elements 251, 261 make it possible to absorb the vibrations due to the clearance of the blades 10, 10'. As shown in FIG. 4, the contact elements 251, 261 are substantially rectangular.

The damper 20 is made mainly of a plastic material. It goes without saying that other synthetic materials could equally be suitable.

With reference to FIG. 3, the front portion 25 of the damper 20 comprises, at its front end, a weight reserve volume 27, called reserve volume 27, terminated at its front end by the front edge 21.

The reserve volume 27 is arranged in order to be cut out in order to calibrate the weight of the damper 20.

Following the molding of the damper 20 during its manufacture, the front edge 21 of the damper 20 comprises a single face that is transverse to the axis X and parallel to the upstream side 141 when the damper is in its housing 14. The reserve volume 27 is cut out in order to obtain a damper 20 calibrated to the desired weight.

The damper 20 is cut out at the front end 21 of the reserve volume 27 in order to arrange, on the front edge 21 of the damper 20, a portion parallel to the upstream side 141 of the housing, corresponding to the first transverse face 21A relative to the axis X, and an inclined portion relative to the upstream side 141 of the housing, corresponding to the second inclined face 21B.

With reference to FIG. 3, the inclined portion 21B of the front edge 21 is to the left of the parallel portion 21A. The inclined portion 21B is not in contact with the upstream side 141, thereby preventing a pivot contact from being created between the damper 20 and the blade 10. The damper 20 cannot then move in the housing 14 when the engine is operating.

DESCRIPTION OF THE PREFERRED EMBODIMENTS

First Exemplary Embodiment

Rectilinear Cut-Out of the Reserve Volume

Figure 5:
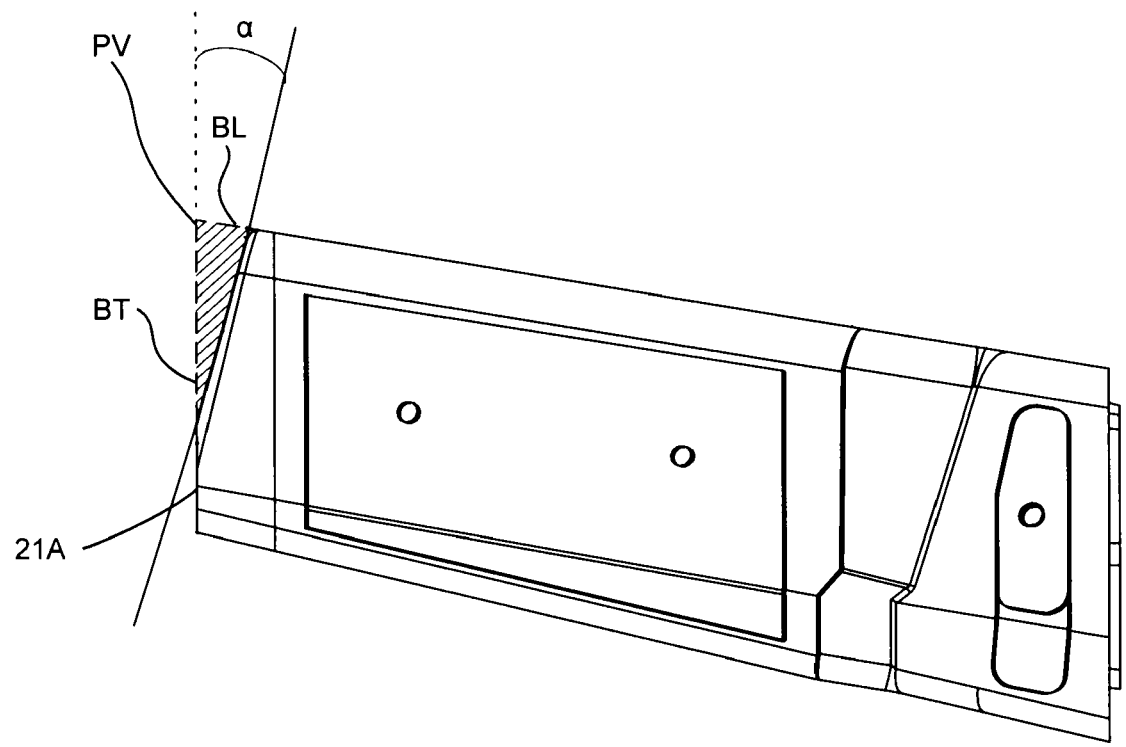
FIG. 5 represents a nearer view of the cut-out zone of the damper of FIG. 4.

In a first exemplary embodiment, with reference to FIGS. 4 and 5, the reserve volume 27 is cut out, or beveled, in a rectilinear manner, the angle of cut-out α, formed between the inclined portion 21B and the parallel portion 21A, being between 10° and 20°, preferably equal to 14°.

With reference to FIG. 5 representing the upper face of the damper 20, the user defines, for the upper face of the damper 20, a virtual point PV corresponding to the intersection of the straight line extending the left edge of the damper 20 with the straight line extending the parallel portion 21A of the front edge 21 of the damper 20. The point PV, shown in FIG. 5, corresponds to the corner of the damper 20 before it is cut out.

Still with reference to FIG. 5, the user defines a first longitudinal beveled distance BL corresponding to the distance extending the left edge of the damper 20 up to the virtual point PV. The user also defines a second transverse beveled distance BT corresponding to the distance extending the parallel portion of the front edge of the damper 20 up to the virtual point PV. The longitudinal beveled distance BL is in this instance less than the transverse beveled distance BT.

The contact zone between the damper 20 and the platform 12 is therefore reduced on the upstream side 141 of the housing 14.

The length of the first longitudinal beveled distance BL is between 3.5 mm and 7 mm, preferably equal to 5.8 mm.

The length of the second transverse beveled distance BT is between 18 mm and 22 mm, preferably equal to 20.3 mm.

Second Exemplary Embodiment

Rounded Cut-Out of the Reserve Volume

With reference to FIG. 4, the user makes a concave rounded cut-out of the reserve volume 27 along the intersection of the damper 20 with a sphere, partially represented in FIG. 4, whose radius is between 0.5 m and 0.6 m.

For each of the cut-outs, the user produces a radiation of the ridges 211 of the inclined portion 21B of the damper 20, the radiation consisting in smoothing the ridges 211 by rounding them so that they have a radius of the order of a millimeter (in this instance 1 mm).

All these cut-outs and radiations make it possible to prevent the damper 20 from resting on the platform 14, moving the zones of contact between said parts and causing premature wear of the blades. The cut-out is made so as to limit the upstream contact and to calibrate the weight of the damper.

Depending on the method for calibrating the damper 20, the user determines the reference weight Mref of the damper 20 so that the fan disk, provided with its blades, is balanced. The user measures the effective weight Meff of the damper 20 after manufacture. In general, the effective weight Meff is greater than the reference weight Mref. Then, the user cuts out the weight reserve volume 27 so that the weight of the cut-out damper 20 is equal to the reference weight Mref.

Cutting out the damper makes it possible to solve two disadvantages at the same time: its positioning and its calibration.

Once cut out, the damper 20 is housed in its housing 14, the parallel portion 21A of the front edge 21 being in abutment with the upstream side 141, the left lateral face 20G being in abutment with the root 13 of the blade 10 and the right lateral face 20D being in abutment with the root 13' of the blade 50. The damper 20 is immobilized between the blades 10, 10' and the fan disk.

The dampers 20 are manufactured with the same molds as those of the prior art. It is therefore not necessary to change the production line to manufacture said dampers.

Advantageously, it is possible to use, in one and the same engine and for one and the same set of blades, dampers according to the prior art and according to the invention. Therefore, for engines already in circulation, it is possible to replace the worn dampers with dampers according to the invention. The benefits of the invention are immediate and do not require structural modifications to the engine.

What is claimed is:

1. A fan blade assembly of a turbojet comprising:
    a fan blade including a root extending in an axial direction parallel to an axis of the turbojet, an airfoil extending in a radial direction perpendicular to the axial direction, and a platform; and
    a fan blade damper being suitable for being attached in a housing formed in a lower face of the platform, said housing comprising an upstream side perpendicular to the root of the blade and extending in a transverse direction perpendicular to both the axial direction and the radial direction,
    wherein the damper includes a front portion and a rear portion offset higher than the front portion, the front portion including a front edge with a first portion which is parallel to the upstream side of the housing and a second portion which is inclined relative to said upstream side of the housing relative to the transverse direction.

2. The assembly as claimed in claim 1 wherein the first portion parallel to the upstream side is in abutment against the upstream side of the housing.

3. The assembly as claimed in claim 1, wherein an angle (α) formed between the first portion of the front edge and the second portion of the front edge is between 10° and 20°.

4. The assembly as claimed in claim 1, wherein the second portion of the front edge forms a flat surface.

5. The assembly as claimed in claim 1, wherein the second portion of the front edge forms a curved surface.

6. The assembly as claimed in claim 1, wherein ridges of the second portion of the front edge are rounded.

7. The assembly as claimed in claim 1, wherein an outer surface of the damper comprises at least one metallic contact zone.

8. The assembly as claimed in claim 1, wherein the damper includes non-parallel lateral faces, and a distance between the lateral faces is less in the front portion relative to the rear portion.

9. The assembly as claimed in claim 1, wherein an upper face of the damper includes a right upper face and a left upper face separated by an interface ridge, and one of the right or left upper faces is in contact with the lower face of the platform.

10. A fan blade damper of a turbojet, extending in its length along an axis oriented X, in its width along an axis oriented Y and in its height along an axis Z, comprising:
    a first front portion and a second rear portion of polygonal cross section relative to the axis X;
    an upper face comprising an upper right inclined face and an upper left inclined face; and
    a front edge being formed at a front of the first front portion of the damper,
    wherein the front edge includes a first face that is transverse relative to the axis X and a second face that is inclined relative to said first face relative to the axis Y.

11. A fan blade assembly of a turbojet including the damper as claimed in claim 10.

12. A method for calibrating a damper of a fan blade assembly of a turbojet with fan and a fan blade damper comprising a weight reserve volume, the method comprising:
    determining a reference weight Mref of the damper;
    measuring an effective weight Meff of the damper;

cutting out the weight reserve volume so that the weight of the cut-out damper is equal to the reference weight Mref.

13. The method as claimed in claim 12, wherein the weight reserve volume is situated at a front end of the damper.

14. The method as claimed in claim 12, wherein the damper extends in its length along an axis oriented X, in its width along an axis oriented Y and in its height along an axis Z, the damper including:
- a first front portion and a second rear portion of polygonal cross section relative to the axis X;
- an upper face comprising an upper right inclined face and an upper left inclined face; and
- a front edge being formed at a front of the first front portion of the damper,
- wherein the front edge includes a first face that is transverse relative to the axis X and a second face that is inclined relative to said first face relative to the axis Y.

* * * * *